United States Patent [19]

Potts et al.

[11] Patent Number: 5,487,593
[45] Date of Patent: Jan. 30, 1996

[54] ANTI-LOCK BRAKING SYSTEM PROVIDING PUMP MOTOR DUTY CYCLE BASED ON DECELERATION AND MOTOR VOLTAGE FEED BACK

[75] Inventors: Jeffrey R. Potts, Grangler; Charles E. Lindenman; Thomas A. Grana, both of South Bend, all of Ind.

[73] Assignee: AlliedSignal Inc., Morristown, N.J.

[21] Appl. No.: 344,766

[22] Filed: Nov. 23, 1994

[51] Int. Cl.⁶ ............................................ B60T 13/18
[52] U.S. Cl. ............................................ 303/11; 303/116.1
[58] Field of Search ................... 364/426.02; 303/10–11, 303/92, 115.4, 116.1, 95, 103, 104

[56] References Cited

U.S. PATENT DOCUMENTS

| 4,025,124 | 5/1977 | Fuchs | 303/10 |
|---|---|---|---|
| 4,402,554 | 9/1983 | Belart | 303/10 |
| 4,428,624 | 1/1984 | Farr | 303/116 |
| 4,477,125 | 10/1984 | Belart et al. | 303/116 |
| 4,556,260 | 12/1985 | Maehara | 303/116 |
| 4,569,560 | 2/1986 | Kubo | 303/116 |
| 4,738,493 | 4/1988 | Inagaki et al. | 303/116 |
| 4,778,226 | 10/1988 | Brown | 303/116 |
| 4,783,125 | 11/1988 | Belart et al. | 303/92 |
| 5,000,525 | 3/1991 | Reinartz et al. | 303/116 |
| 5,033,800 | 7/1991 | Willmann | 303/116 |
| 5,106,171 | 4/1992 | Leppek et al. | 303/100 |
| 5,184,299 | 2/1993 | Hogan et al. | 364/426.02 |
| 5,188,440 | 2/1993 | Muller et al. | 303/116.2 |
| 5,197,787 | 3/1993 | Matsuda et al. | 303/10 |
| 5,197,788 | 3/1993 | Fennel et al. | 303/100 |

*Primary Examiner*—Josie A. Ballato
*Attorney, Agent, or Firm*—Larry J. Palguta; Leo H. McCormick, Jr.

[57] ABSTRACT

An anti-lock braking system (1) includes an electronic control unit or ECU having software which utilizes inputs of deceleration and pump motor voltage feedback to effect an appropriate duty cycle for the pump motor. By utilizing vehicle velocity, calculated vehicle deceleration and wheel deceleration to estimate the type of surface engaged by the vehicle wheels, and utilizing motor voltage to estimate pump load, the duty cycle of the motor may be varied so that low brake pedal effort braking has the benefit of less pump motor operation and reduced pump motor noise.

10 Claims, 4 Drawing Sheets

ANTI-LOCK BRAKING SYSTEM PROVIDING PUMP MOTOR DUTY CYCLE BASED ON DECELERATION AND MOTOR VOLTAGE FEED BACK

The present invention relates generally to anti-lock braking systems, and in particular to anti-lock braking systems including a pump motor whose duty cycle may be varied to reduce overall pump motor operation and noise.

BACKGROUND OF THE INVENTION

Many anti-lock braking systems have been utilized on vehicles. Typically, anti-lock braking systems which include a pump for creating flow within the system operate the pump motor at a 100% duty cycle during all anti-lock braking stops. The result is that during light brake pedal effort stops, the pump motor is operated at a 100% duty cycle which exceeds the fluid flow requirements or load of the pump and results in unnecessary pump motor noise. It is highly desirable to provide a pump motor that is operated at less than 100% duty cycle in accordance with lower brake pedal effort stops or braking being effected by the vehicle operator, in order to reduce pump operation and noise. It is desirable that operation of the pump at less than 100% duty cycle be effected via the software within the electronic control unit, thus eliminating the requirement for additional hardware within the system.

SUMMARY OF THE INVENTION

The present invention provides solutions to the above by providing a method of determining a duty cycle of a pump motor in an anti-lock braking system of a vehicle, comprising the steps of:

a. determining that the mode of braking is during anti-lock braking, b. utilizing estimated calculated vehicle deceleration and wheel deceleration to estimate the coefficient of friction of a surface engaged by wheels of the vehicle, c. estimating pump flow requirements for said pump motor, d. selecting an initial duty cycle for the pump motor, e. pulsing the pump motor on and off in accordance with the selected initial duty cycle, f. utilizing decay voltage of the pump motor when the pump motor is deactivated to estimate a pump load requirement imposed on the motor, g. determining if the selected initial duty cycle is sufficient to provide the estimated pump flow requirements and the pump load requirement, and h. controlling operation of the pump motor by changing, as necessary, the duty cycle.

DESCRIPTION OF THE DRAWINGS

One way of carrying out the invention is described in detail below with reference to the drawings which illustrate an embodiment in which.

DESCRIPTION OF THE INVENTION

Figure 1:
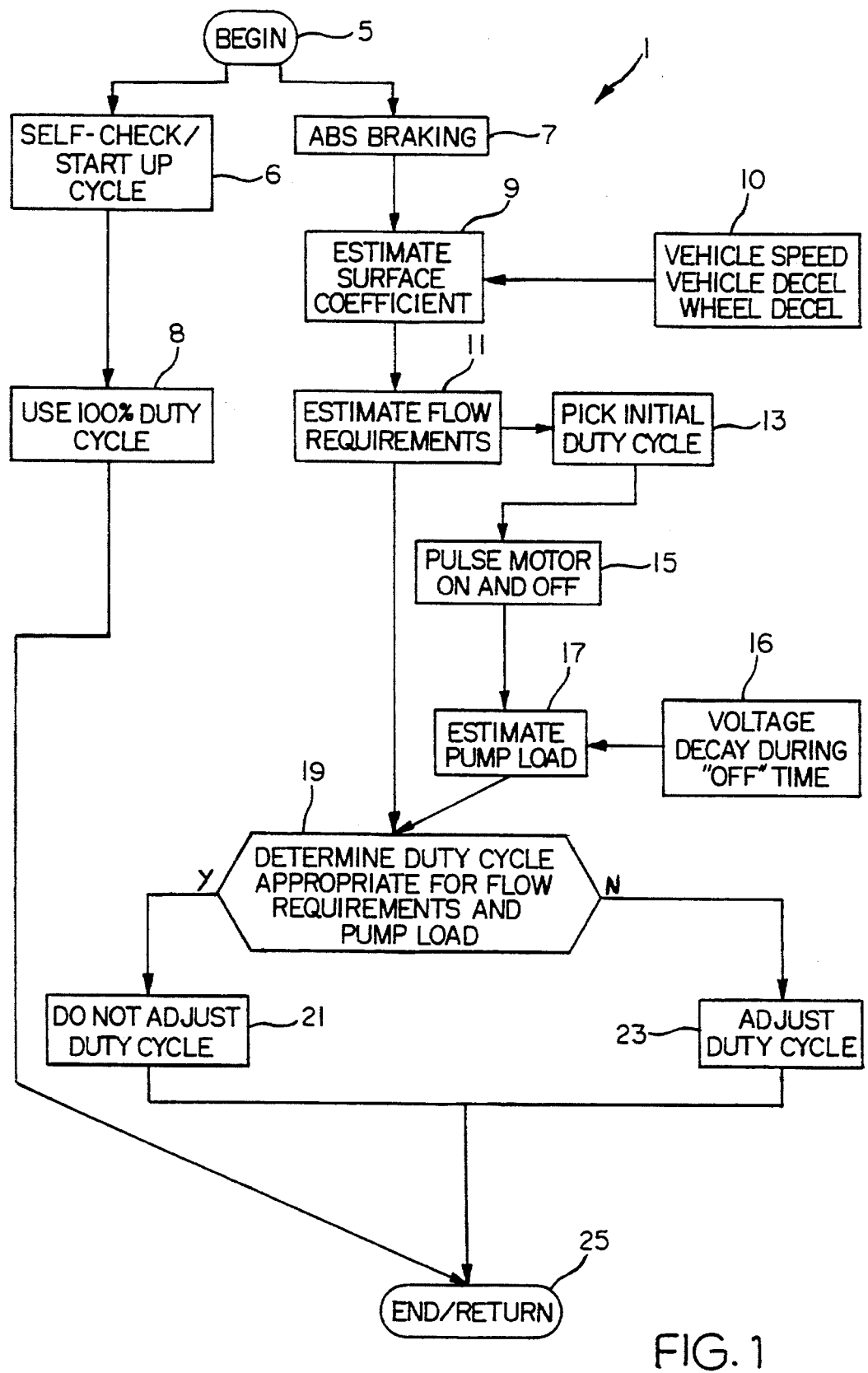
FIG. 1 is a simplified flow chart of the software program contained in the invention.

Many anti-lock braking systems include a pump motor which provides fluid flow within the system. Typically, the required pump flow rate for an anti-lock braking system is greater during higher pedal braking effort stops. Therefore, the size of the pump and associated electric motor are based on the fluid flow requirements of the high braking effort stops. This results in an excess pump capacity that is present for low braking effort stops during anti-lock braking control operation. This excess pump capacity often results in noise within the system during the light braking effort stops. Thus, it is possible to reduce the duty cycle of the pump motor in order to reduce the noise effected by the anti-lock braking system during light braking effort stops. Referring to FIG. 1, an electronic control unit or ECU (not shown) of the system includes a software program 1 which begins at BLOCK 5. The blocks of the software program contain numbers which correspond generally with some of the numbers in the more detailed software program of FIGS. 2A and 2B. Subsequent to the commencement of the program at BLOCK 5 and during vehicle drive-off, the vehicle effects a self-check/start-up cycle at BLOCK 6 which initiates an activation of the pump motor at BLOCK 8 and utilizes a 100% duty cycle for approximately 130 milliseconds. The self-check/start-up cycle at 100% duty cycle for the pump motor during drive off of the vehicle is utilized to determine that the pump motor is operating appropriately. A self-check/start-up cycle to determine that the pump motor is operating appropriately is disclosed in co-owned and co-pending patent application Ser. No. 08/344,755. The program also proceeds to BLOCK 7 to determine or identify a mode of operation of the vehicle brakes. The mode of operation which is detected is anti-lock braking wherein, at the initiation of anti-lock braking, the pump motor is activated with a 100% duty cycle. Next, the program at BLOCK 9 effects an estimate of the type of surface engaged by the wheels of the vehicle. In other words, the software program estimates what type of coefficient of friction surface is engaged by the wheels of the vehicle. This is accomplished by utilizing vehicle speed, estimated calculated vehicle deceleration, and wheel deceleration (from at least one or more wheels of the vehicle) from BLOCK 10. Once the software system has estimated the type of surface engaged by the wheels of the vehicle, BLOCK 11 of the program utilizes the estimate of the type of surface to provide estimated fluid flow requirements of the pump. Once the pump fluid flow requirements are estimated at BLOCK 11 of the program, the program selects an initial duty cycle for the pump motor at BLOCK 13. Via BLOCK 15, the pump motor is pulsed on and off at this duty cycle. When the pump motor is deactivated by the off signal effected by the program at BLOCK 15, the motor voltage within the motor monitor circuit is dependent on the back EMF (electro-motive force) of the motor. The back EMF is a function of the speed of the motor, which in turn is a function of the load imposed on the pump motor. Because the rate of decrease of the motor voltage is a function of pump motor load, the higher the pedal braking effort effected by the vehicle operator, the higher the rate of decrease in pump motor voltage when the motor is de-energized. By measuring the rate of decrease of the motor voltage, the brake pedal braking effort can be estimated. At BLOCK 17 of the program, the pump load (and thus the brake pedal braking effort) is estimated based on the input from BLOCK 16 which is an evaluation of the rate of decrease of the terminal voltage, or evaluation of the back EMF as disclosed in co-owned and co-pending patent application Ser. No. 08/344,755. The estimated pump load which corresponds to an estimated brake pedal braking effort, is supplied to BLOCK 19, along with the estimated fluid flow requirements from BLOCK 11, where it is determined whether or not the duty cycle of the pump motor is sufficient for the flow requirements and pump load requirement. If the duty cycle is determined to be appropriate for the fluid flow requirements and pump load requirement, then the program does not adjust the duty cycle, as illustrated at BLOCK 21, and the program proceeds to the END/RETURN BLOCK 25 wherein the program returns to the BEGIN BLOCK 5. If it is determined that the duty cycle is not appropriate, then the duty cycle of the pump motor is adjusted by the program at BLOCK 23 before the program proceeds to the END/RETURN BLOCK 25.

The duty cycle of the pump motor is reduced by the electronic control unit of the anti-lock braking system during light brake pedal apply stops so that the system noise is reduced. The present invention utilizes vehicle speed, estimated calculated vehicle deceleration, the deceleration of a wheel and motor voltage feedback to effect changes in the duty cycle of the pump motor. Utilizing the estimated calculated vehicle deceleration has the added benefit in that it is self-correcting. If the duty cycle of the pump motor is reduced too much, then wheel slip levels will increase. This causes the calculated vehicle deceleration to increase and results in a higher duty cycle to be selected. The electronic control unit of the anti-lock braking system receives an input of pump motor voltage which has been provided for fail-safe protection. The pump motor voltage decay is utilized to provide an estimated pump load and results in the duty cycle of the pump motor being adjusted to maintain an average motor voltage. Adjusting the duty cycle to maintain an average motor voltage has the advantage of providing automatic adjustment of the duty cycle when the vehicle system voltage is low, such as from a low battery. Thus, the average voltage of the duty cycle provides a target voltage that is independent of the system voltage. An additional advantage is that there is provided an automatic adjustment of the duty cycle according to brake pedal effort. Higher brake pedal effort requires more fluid requirements which results in more pump operation. The software utilized for the implementation of the present invention permits a reduction of the duty cycle of the pump motor when the vehicle is on the lower coefficient surfaces and also automatically adjusts for brake pedal effort. Vehicle performance is not degraded and a significant reduction in noise can be achieved.

Figure 2A:
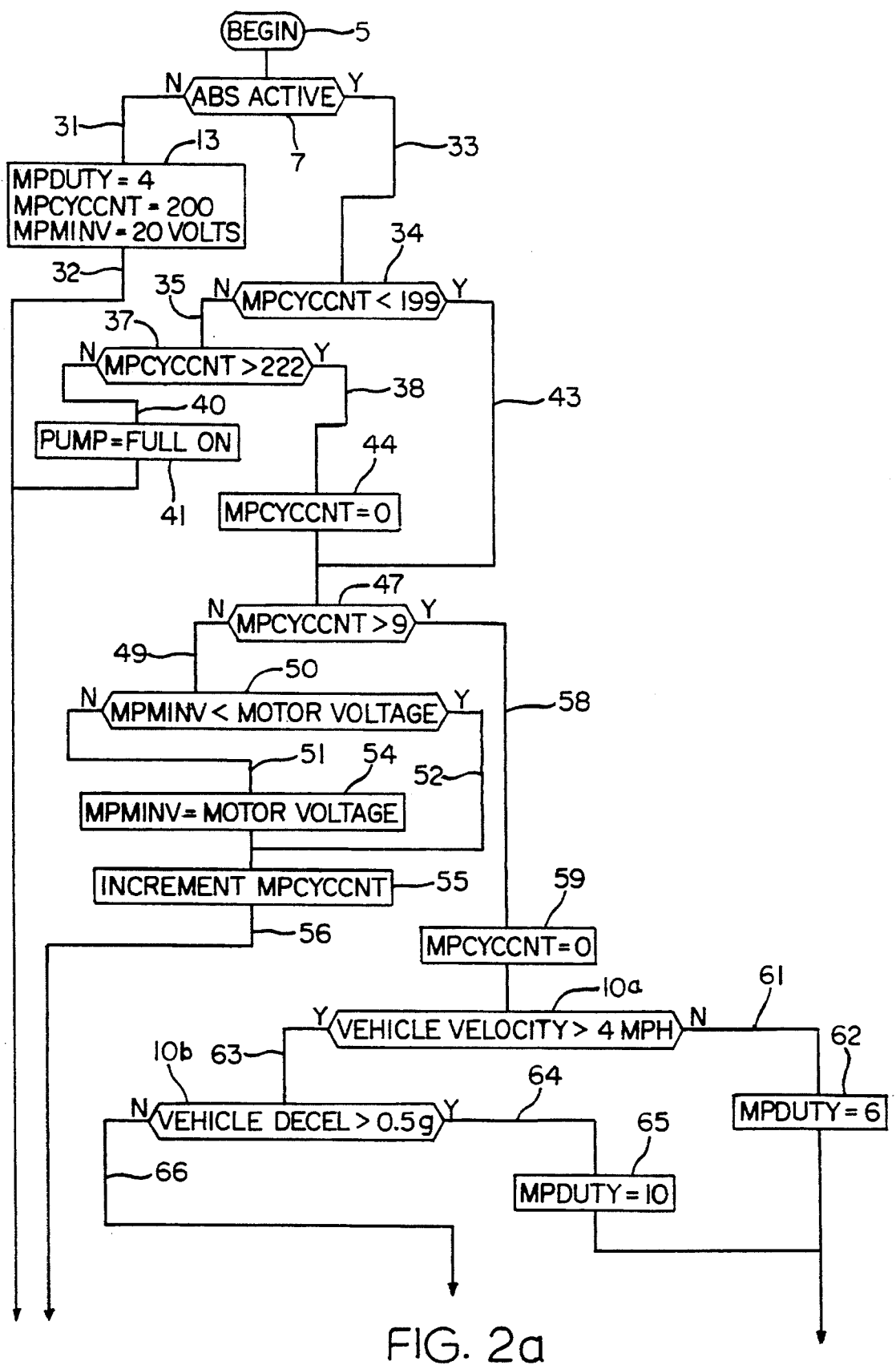
FIGS. 2A and 2B are a more detailed flow chart of the flow chart illustrated in FIG. 1.
Figure 2B:
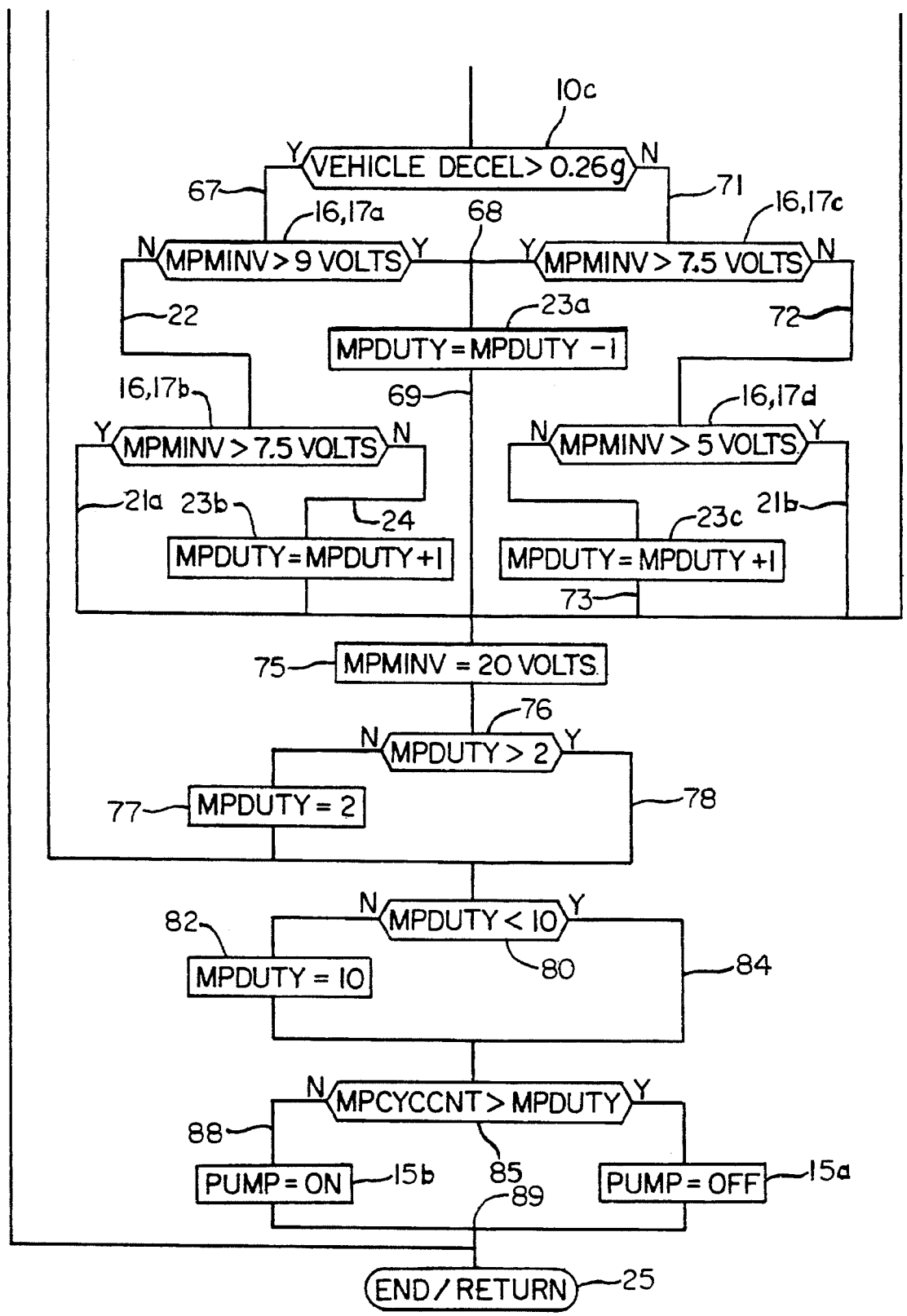

Referring to FIGS. 2A and 2B, the software program implementing the present invention commences at the begin BLOCK 5. From BLOCK 5 the software program proceeds to BLOCK 7 to determine whether or not the anti-lock braking system is active. If the anti-lock system is not active the software program proceeds via line 31 to BLOCK 13 where the motor pump duty cycle is set equal to four, the motor pump cycle count is set equal to 200, and the motor pump minimum voltage is set equal to 20 volts. These various values are chosen to activate the pump for a minimum initial start-up time in order to provide appropriate pump flow, to effect a duty cycle once the pump has operated for a desired initial time, and to set a minimum voltage so that the actual motor voltage minimum value will be saved. The program proceeds via line 32 to the end return BLOCK 25 and then recycles to the begin BLOCK 5. If the anti-lock braking system is determined to be active at BLOCK 7, the program proceeds via line 33 to BLOCK 34 where it is determined whether or not the motor pump cycle count is less than 199 counts. Because the counter has been previously set at 200 counts at BLOCK 13, the program will proceed via line 35 to BLOCK 37 where it is determined if the motor pump cycle count is greater than 222. Again, because the motor pump cycle count has been previously set at 200 at BLOCK 13, the program will proceed via line 40 to the end return BLOCK 25. When the program proceeds via line 40 to line 32, the pump duty cycle is set equal to full on at BLOCK 41 so that the pump continues to operate at 100% duty cycle. In essence, this allows the pump motor to operate for a period of time (between counts 200 and 223) in order for the pump to run an initial period of time and provide appropriate pump flow and to protect the electrical relays. Once the program has run through enough loops to set the counter at greater than 222, for instance at count 223, the program will proceed from BLOCK 37 via line 38 to BLOCK 44 where the motor pump cycle count is reset to zero in order to clear the counter. Thus, in any subsequent loop the counter at BLOCK 34 will be less than 199 and the program will proceed via line 43 to BLOCK 47. When the program has proceeded to BLOCK 47, either via line 38 and BLOCK 44 or via line 43, the program determines if the motor pump cycle count is greater than nine. A count of 10 is equal to the 50 millisecond duty cycle period of the program. If the motor pump cycle count is not greater than nine (it is between zero and nine), the program proceeds via line 49 to BLOCK 50 where it is determined whether or not the motor pump minimum voltage is less than the actual motor voltage. The purpose of BLOCK 50 is to effect the saving or retention of the minimum motor voltage. If the motor pump minimum voltage is not less than the motor voltage, then the program proceeds via line 51 to BLOCK 54 where the motor pump minimum voltage is set equal to the motor voltage, thereby saving the minimum motor voltage. However, should the motor pump minimum voltage be less than motor voltage, the program proceeds directly via line 52 to BLOCK 55. At BLOCK 55 the motor pump cycle count is incremented and the program proceeds via line 56 to the latter portion of the program. At this point there is a new duty cycle that has been effected and the program will wait approximately 50 milliseconds before adjusting the duty cycle, but during that time it is necessary to save the motor pump minimum voltage, as has been accomplished above at BLOCK 54.

Returning to BLOCK 47, if the motor pump cycle count is greater than nine, then an entire 50 millisecond period has elapsed and the program proceeds via line 58 to BLOCK 59 where the motor pump cycle count is set equal to zero in order to restart the 50 millisecond loop at a later portion of the program. At BLOCK 10a the program determines whether or not the vehicle velocity is greater than four mph. If the vehicle velocity is less than four mph, then the vehicle is moving slow enough that a 60% duty cycle can be set at BLOCK 62 via line 61. This provides enough fluid flow to finish the pump flow requirements during the stop. If the vehicle velocity is equal to or greater than four mph at BLOCK 10a, then the program proceeds via line 63 to BLOCK 10b where the program determines whether or not the vehicle deceleration is greater than 0.5 g. If the estimated vehicle deceleration is greater than 0.5 g, the program proceeds via line 64 to BLOCK 65 where the motor pump duty cycle is set at 10, which is a full on or 100% duty cycle, so that a higher deceleration stop which requires higher pedal effort for an anti-lock braking stop will have a sufficient duty cycle and pump flow. However, if it is determined at BLOCK 10b that the vehicle deceleration is not greater than 0.5 g, the program proceeds via line 66 to BLOCK 10c. If the estimated vehicle deceleration is greater than 0.26 g, the program proceeds via line 67 to BLOCK 16, 17a to determine if the motor pump minimum voltage is greater than nine volts. Should the program determine that the motor pump minimum voltage is greater than nine volts, then it is necessary to adjust the duty cycle by decreasing it. The program proceeds via line 68 to BLOCK 23a where the motor pump duty cycle is set equal to motor pump duty cycle minus one, so that duty cycle is decreased. Because the voltage is greater than nine volts, this indicates that there is a lesser pedal effort provided which effects a higher decay voltage at this point and therefore less pump capacity would be sufficient to provide the pump needs, and therefore the duty cycle is decreased. The program then proceeds via line 69. If at BLOCK 16, 17a the motor pump minimum voltage is not greater than nine volts, the program proceeds via line 22 to BLOCK 16, 17b where it is determined whether or not the motor pump minimum voltage is greater than 7.5 volts. If the decay voltage of the motor pump is greater than 7.5 volts, then the program proceeds via line 21 a to BLOCK 75 wherein the motor pump minimum voltage is set at a high initial value for recalculation of the minimum motor voltage at the earlier portion of the program. However, if the motor pump minimum voltage is not greater than 7.5 volts, then it is determined that because of the low decay voltage of the motor pump, there is a high pedal effort and therefore increased pump operation is necessary and the program proceeds via line 24 to BLOCK 23b where the motor pump duty cycle is increased by one in order to increase the duty cycle of the pump motor. The program then proceeds to BLOCK 75. If at BLOCK 10c the estimated vehicle deceleration is determined to be equal to or less than 0.26 g, the program proceeds via line 71 to BLOCK 16, 17c to determine if the motor pump minimum voltage is greater than 7.5 volts. If a larger value exists for the decay voltage of the pump motor, it is determined that there is excess pump capacity and therefore the duty cycle of the pump motor will be decreased at BLOCK 23a. However, if the motor pump minimum voltage is not greater than 7.5 volts, the program proceeds from BLOCK 16, 17c via line 72 to BLOCK 16, 17d to determine if the motor pump minimum voltage is greater than five volts. If the voltage is greater than five volts, then the program proceeds via line 21b to BLOCK 75. However, if the motor pump minimum voltage is not greater than five volts, then it is determined that a greater or increased pump capacity is required and at BLOCK 23c the motor pump duty cycle is increased in order to increase the pump flow. The program then proceeds via line 73 to BLOCK 75 where the motor pump minimum voltage is set at 20 volts to effect a recalculation of the motor pump minimum voltage by the program. After BLOCK 75, the program proceeds to BLOCK 76 to determine if the motor pump duty cycle is greater than two or 20%. If the duty cycle is not greater than two, then the program proceeds to BLOCK 77 wherein the duty cycle is set equal to two. Otherwise, if the duty cycle is greater than two, then the program proceeds via line 78 to BLOCK 80 wherein the program determines whether or not the motor pump duty cycle is less than 10 or 100%. If it is determined that the motor pump cycle is equal to or greater than 10, the program proceeds to BLOCK 82 where the motor pump duty cycle is set equal to 10 or 100%. If it is determined that motor pump duty cycle is less than 10, the program proceeds via line 84 to BLOCK 85. The purpose of BLOCKS 80 and 82 is to keep the system from over-adjusting to a duty cycle of greater than 100%. At BLOCK 85 it is determined whether or not the motor pump cycle count is greater than the motor pump duty cycle. If the motor pump cycle count is greater than the motor pump duty cycle, the program proceeds to BLOCK 15a where the pump is turned off. If the motor pump cycle count is not greater than the motor pump duty cycle, the program proceeds via line 88 to BLOCK 15b where the pump is turned on. The program then proceeds via line 89 to the END/RETURN BLOCK 25 so that the program may proceed through another loop.

Figure 3:
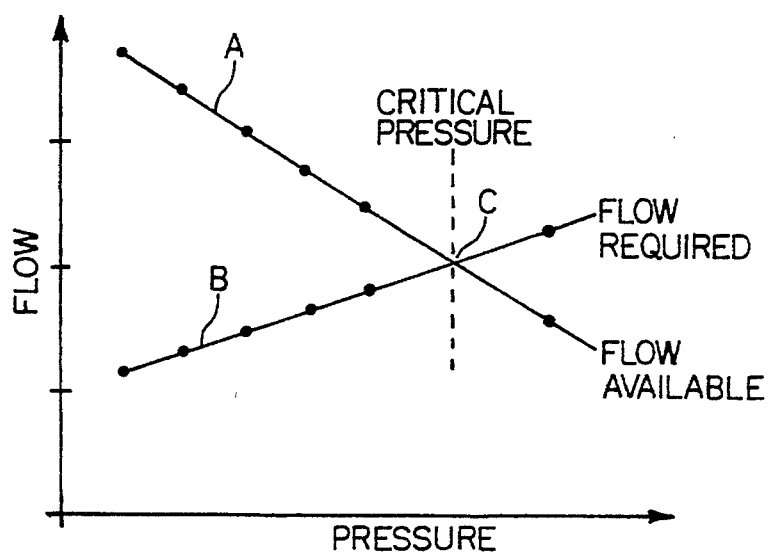
FIG. 3 is a graph of flow versus pressure for a pump motor operated at a 100% duty cycle.
Figure 4:
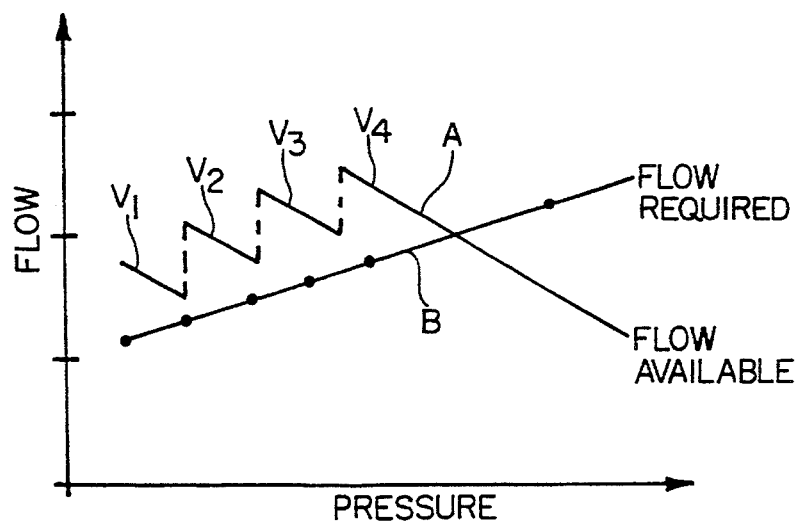
FIG. 4 is a graph of flow versus pressure for a pump motor operated in accordance with the present invention.
Figure 5:
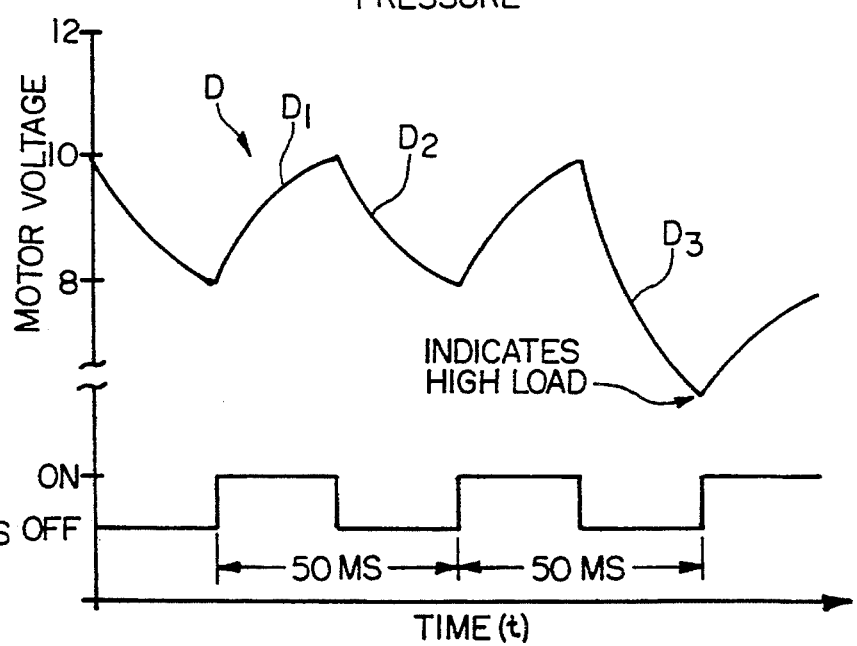
FIG. 5 is a graph illustrating pump motor on-off pulses and the corresponding pump motor voltage.

Referring to FIG. 3, the graph illustrates the flow requirements of the pump motor versus the increasing fluid pressure effected by the pump motor. Curve A illustrates the typical pump motor flow available when the pump motor is operated at 100% duty cycle. Curve B is the theoretical fluid flow required and Curves A and B will cross at a point C which is the critical pressure at which the available fluid flow meets the fluid flow requirements. As the fluid flow requirements of Curve B increase, the fluid flow available of Curve A will decrease. FIG. 4 illustrates the fluid flow requirements of a conventional pump motor versus the pressure provided by a pump motor operated in accordance with the present invention. The pulsed pump motor operates to provide the fluid flow available illustrated by Curve A wherein selected average voltages of the duty cycle are illustrated by corresponding portions $V_1$, $V_2$, $V_3$, and $V_4$ of Curve A. Thus, a pump motor which receives varying duty cycles effected via average voltages as shown by the initial portion of Curve A more closely approximates the total flow requirements of Curve B, thereby reducing the operation of the pump motor and any corresponding pump motor noise. FIG. 5 illustrates pump motor pulses effected during fifty millisecond periods. The motor voltage in Curve D corresponding to the activation and deactivation of the pump motor via the pump motor pulses illustrates the increase in voltage during portion $D_1$ of the curve and the decrease of the voltage present on the motor monitor circuit during portion $D_2$ of the curve. Curve portion $D_3$ decreases faster during pump motor deactivation to a lower voltage level, and this indicates a high pump load which will be responded to by an increase in the duty cycle because the average voltage level of the pump motor during deactivation (the back EMF) has decreased.

We claim:

1. A method of determining a duty cycle of a pump motor in an anti-lock braking system of a vehicle, comprising the steps of:

a. determining that the mode of braking is during anti-lock braking, b. utilizing estimated calculated vehicle deceleration and wheel deceleration to estimate the coefficient of friction of a surface engaged by wheels of the vehicle, c. estimating pump flow requirements for said pump motor, d. selecting an initial duty cycle for the pump motor, e. pulsing the pump motor on and off in accordance with the selected initial duty cycle, f. utilizing decay voltage of the pump motor when the pump motor is deactivated to estimate a pump load requirement imposed on the motor, g. determining if the selected initial duty cycle is sufficient to provide the estimated pump flow requirements and the pump load requirement, and h. controlling operation of the pump motor by changing, as necessary, the duty cycle.

2. The method in accordance with claim 1, further including the step of initially activating the pump motor with a 100% duty cycle.

3. The method in accordance with claim 1, further comprising the steps of initiating a self-check/start-up cycle for the pump motor during vehicle drive-off, and activating the pump motor with a 100% duty cycle during vehicle drive-off.

4. The method in accordance with claim 1, further comprising the step of utilizing vehicle speed for estimating the coefficient of friction of the surface.

5. In a wheeled vehicle having means for supplying pressurized brake fluid to actuate associated wheel brakes of the vehicle, a brake control system for providing anti-lock braking of at least one selected wheel brake of the vehicle, said brake control system effecting a duty cycle for a pump motor of the system and including:

a. means for determining the mode of the selected wheel brake as being braking during anti-lock braking, b. means for estimating the coefficient of friction of a surface engaged by wheels of the vehicle, c. means for estimating fluid flow requirements for said pump motor, d. means for selecting an initial duty cycle of the pump motor and pulsing the motor on and off in accordance therewith, e. means utilizing pump motor voltage decay to estimate a load requirement imposed on said pump motor, and f. means for determining if the selected duty cycle of the pump motor is sufficient to provide the estimated fluid flow requirements and the pump load requirement and adjusting, as necessary, the duty cycle of said pump motor.

6. The brake control system in accordance with claim 5, further comprising means for providing vehicle speed, estimated calculated vehicle deceleration and the deceleration of a wheel associated with said selected wheel brake.

7. The brake control system in accordance with claim 6, wherein said means for estimating the load requirement of said pump motor comprises means utilizing pump motor voltage decay subsequent to pump motor deactivation.

8. An anti-lock braking system of a vehicle having control means for determining a duty cycle of a pump motor, comprising:

a. means for determining that the mode of braking is anti-lock braking, b. means for utilizing vehicle speed, estimated calculated vehicle deceleration and wheel deceleration to estimate the coefficient of friction of a surface engaged by wheels of the vehicle, c. means for estimating pump flow requirements for said pump motor, d. means for selecting an initial duty cycle for the pump motor, e. means for pulsing the pump motor on and off in accordance with the selected initial duty cycle, f. means for utilizing decay voltage of the pump motor when the pump motor is deactivated to estimate a pump load requirement imposed on the motor, g. means for determining if the selected initial duty cycle is sufficient to provide the estimated pump flow requirements and the pump load requirement, and h. means for controlling operation of the pump motor by changing, as necessary, the duty cycle.

9. The system in accordance with claim 8, further including means for initially activating the pump motor with a 100% duty cycle.

10. The system in accordance with claim 8, further comprising means for initiating a self-check/start-up cycle for the pump motor during vehicle drive-off whereby the pump motor is activated with a 100% duty cycle.

* * * * *